Aug. 15, 1950 R. P. HAVILAND 2,518,470

AUTOMATIC TUNING DEVICE

Filed March 29, 1949

Inventor
ROBERT P. HAVILAND

By [signature]

Attorney

Patented Aug. 15, 1950 2,518,470

UNITED STATES PATENT OFFICE 2,518,470

AUTOMATIC TUNING DEVICE

Robert P. Haviland, Scotia, N. Y.

Application March 29, 1949, Serial No. 84,242

8 Claims. (Cl. 250—40)

(Granted under the act of March 3, 1883, as amended April 30, 1928; 370 O. G. 757)

The present invention relates to automatic tuning devices and more particularly to a device for automatically tuning a resonant circuit to its optimum operating point and to maintain the circuit at that point.

More specifically this invention concerns a type of control circuit suitable for control of the direction of rotation of a motor for usages such as remote control of an element of a tuning circuit. The means for controlling the circuit may be derived from the deviation in frequency of a radio frequency signal being amplified and the motor may tune the tank circuit of the amplifier to the frequency of the signal to be amplified. The control signal for the circuit may also represent the deviations in the mean frequency of an oscillator so that the motor drives an element of the tuning circuit of said oscillator to stabilize automatically the operation of the oscillator. As will become apparent from the following detailed description, the circuit of the invention may be applicable to numerous other uses in the radio and electronic arts, and the invention is not intended to be limited to the specific embodiment disclosed.

According to a preferred embodiment of this invention, means are provided for periodically varying the reactance of one of the elements of a tuned or resonant circuit. This periodic variation results in a similar periodic variation in the output of the resonant circuit, a portion of which output is utilized as the control potential for the motor for maintaining the resonant circuit at its optimum operating point. Having attained this optimum condition, the motor will then remain stationary until a deviation occurs.

An object of this invention is the provision of an automatic control circuit for maintaining a resonant circuit at its optimum operating point.

Another object of this invention is the provision of an automatic tuning circuit which is particularly applicable to remote control operation.

A further object is to provide an automatic tuning control circuit of high control sensitivity and completely electronic control.

Still another object of this invention is the provision of an automatic tuning device which does not interfere with the normal operation of the circuit in which it is employed.

Figure 1:
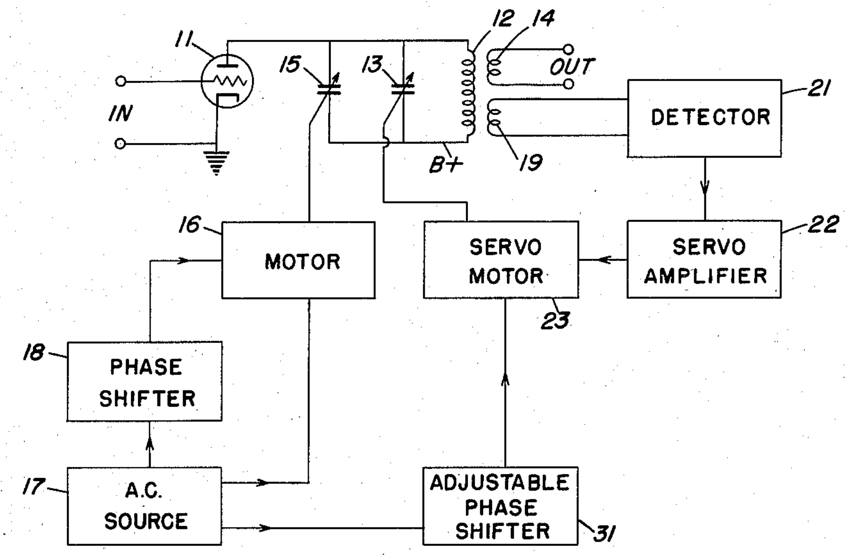
Figure 2:
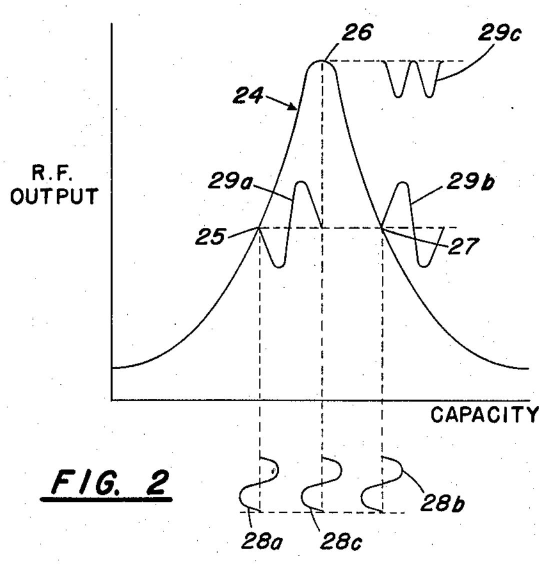

The exact nature of this invention as well as other objects and advantages thereof will be readily apparent from consideration of the following specification relating to the annexed drawing in which:

Fig. 1 illustrates a circuit arrangement of one embodiment of the present invention as applied to the tank circuit of a radio frequency amplifier; and Fig. 2 shows a plurality of wave forms illustrating the operation of a portion of the circuit of Fig. 1.

Referring now to the drawings, there is shown in Fig. 1 a radio frequency amplifier comprising a tube 11 having a tank circuit consisting of an inductance 12 and a variable capacitor 13 connected to the output thereof. The radio frequency signal is supplied to the input of tube 11 and the amplified signal is derived from coil 14, coupled in any suitable manner to inductance 12, for being fed to the next succeeding amplifier stage, or to the detector, as in conventional receiver circuits.

Connected in parallel with capacitor 13, is a second variable capacitor 15, of relatively small capacitance as compared with capacitor 13, capacitor 15 being periodically varied by a small motor 16 mechanically coupled thereto. Motor 16 may be of any conventional type and is preferably of the two phase type, driven by an alternating current source 17, there being a phase shifter 18 interposed between source 17 and one input of motor 16 in order to supply the proper voltages to motor 16. Motor 16 periodically varies the capacity of capacitor 15 so as to periodically vary the total capacity of the tank circuit, the frequency $f$ of this modulation of the total capacity and the ratio of the capacities of capacitors 15 and 13 being chosen so that this impressed modulation does not interfere with the normal operation of the amplifier.

Coupled to inductance 12, by means of a coil 19, is a detector 21 for detecting the modulations impressed on the radio frequency signal by capacitor 15, the output of detector 21 being fed to any control system, such as a servo system illustrated as comprising a servo amplifier 22 and a servo motor 23. Motor 23 is driven by source 17, there being interposed between source 17 and one input of motor 23, which is preferably of the two phase type, an adjustable phase shifter 31 for properly adjusting the phase of that input.

Referring now to Fig. 2 there is shown a curve 24 representing the radio frequency output signal across inductance 12, and similarly across coil 19, as a function of the total capacity in the tuned circuit. If it is assumed that the total value of the capacity of the tuned circuit is such that the circuit is operating at point 25 of curve 24 with respect to the frequency of the incoming signal, it is obvious that the capacity of the tuned circuit must be increased to bring the amplifier to its optimum operating point, namely point 26 of curve 24. On the other hand, operation at point 27 would require a decrease in total capacity.

Now, assuming that the circuit is operating at point 25, variation in capacity 15 by motor 16 would vary the total capacity of the tuned circuit in accordance with curve 28*a*, resulting in a variation in the output of the tuned circuit in accordance with wave 29*a*. Similarly, operation at point 27 would cause the variations in the total capacity, represented by wave form 28*b*, to produce an output variation corresponding to wave form 29*b*. It can be readily seen that the outputs 29*a*, 29*b*, are of equal amplitude and frequency, but are 180 degrees out of phase. On the other hand if the tuned circuit was operating at the optimum point with respect to the frequency of the incoming radio frequency signal, namely point 26, variations in capacitance 15 in accordance with curve 28*c*, which is equal to curves 28*a* and 28*b*, would produce an output variation corresponding to curve 29*c* which is of double the frequency of curves 29*a* and 29*b*.

By arranging detector 21 and amplifier 22 to be responsive only to frequency variations corresponding to curves 29*a* and 29*b*, and by utilizing any well-known phase discriminator as the detector, it can be readily seen that the signal supplied to motor 23 will be proper to tune the resonant or tank circuit to its optimum operating point and maintain the circuit at this point.

It is to be understood that the particular arrangement of the detector and motor control forms no part of this invention and that any well-known arrangement may be utilized. For example, the control circuit may be of the type illustrated in U. S. Patent No. 2,380,947, dated August 7, 1945, to Murray G. Crosby. In this arrangement, the control voltage would be derived from the output across coil 19. By placing additional tank circuit condensers on the same shaft as capacitor 13, the system of the present invention may be applied to multi-stage amplifiers. Any other suitable control arrangement may be utilized without departing from the spirit and scope of the present invention as defined in the appended claims.

The invention described herein may be manufactured and used by or for the Government of the United States of America for governmental purposes without the payment of any royalties thereon or therefor.

What is claimed is:

1. In a radio frequency amplifying network having a resonant output circuit including a variable condenser, an automatic tuning device for tuning said circuit to its optimum operating point with respect to the frequency of the signal to be amplified, said device comprising a second variable condenser connected across the circuit condenser, means for periodically varying the capacity of said second condenser to thereby vary the output of the resonant circuit, motive means for varying the capacity of said circuit condenser, and means responsive to the phase of the output of said circuit for controlling the operation of said motive means.

2. An automatic tuning device for a resonant circuit having a variable condenser, said device comprising a source of periodically varying energy coupled to the input of said circuit, a second variable condenser connected across the resonant circuit, motive means for periodically varying the capacity of said second condenser to thereby vary the output of said circuit, motive means for varying the capacity of the variable condenser of said circuit, and means responsive to the time displacement of the output of said circuit for controlling the operation of the last-mentioned motive means.

3. A device according to claim 2, wherein said second condenser is of relatively small capacity with respect to said circuit condenser.

4. An automatic tuning device for maintaining a resonant circuit at its optimum operating point with respect to the frequency of a periodically variable signal supplied thereto, said device comprising a variable condenser connected across the circuit, means for periodically varying the capacity of said condenser to thereby vary the output of said circuit, means for varying one of the elements of said circuit, and means responsive to the phase variations in the output of said circuit due to the variations in said condenser for controlling the operation of the last-named varying means.

5. In combination with a parallel resonant circuit, an automatic tuning device for maintaining said circuit at its optimum operating point with respect to the frequency of a periodically varying signal applied to the input thereof, said device comprising a variable reactance connected across the circuit, means for periodically varying the reactance to thereby vary the output of said circuit, means for varying one of the elements of said circuit, and means responsive to the time displacement variations in the output of said circuit due to variations in said reactance for controlling the operation of the last-named varying means.

6. In combination with a source of radio frequency energy and a tunable load circuit coupled to said source, a device for automatically maintaining said circuit at substantial resonance with respect to the frequency of the applied energy, said device comprising means for varying the frequency to which said circuit is tuned, means for tuning said circuit to resonance independently of the first-named means, and electrical means responsive to the phase variations in the output of said circuit due to the variations in the tuning of said circuit by said first-named means for controlling the operation of said tuning means.

7. In combination with a source of electrical energy having a substantially sinusoidal component and a tunable load circuit having its input end coupled to said source, automatic tuning apparatus comprising means coupled to said circuit for varying the frequency to which said circuit is tuned, means for tuning said circuit to resonance independently of the first-named means, and means coupled to the output end of said circuit and responsive to the time displacement of the sinusoidal component output due to the variations in the tuning of said circuit by said first-named means for controlling the operation of said tuning means.

8. An automatic tuning device for maintaining a tunable load circuit at resonance with respect to the frequency of a sinusoidal component of a signal applied to the input of said circuit, said device comprising means for periodically varying the frequency to which said circuit is tuned, means for independently tuning said circuit to resonance, and means coupled to the output end of said circuit and responsive to the time displacement of the sinusoidal component output due to the variations in the tuning of said circuit by the first-named means for controlling the operation of said tuning means.

ROBERT P. HAVILAND.

REFERENCES CITED

The following references are of record in the file of this patent:

UNITED STATES PATENTS

| Number | Name | Date |
|---|---|---|
| 2,458,684 | Crandell | Jan. 11, 1949 |
| 2,466,931 | Crandell | Apr. 12, 1949 |